US007124772B1

(12) United States Patent
Browning

(10) Patent No.: US 7,124,772 B1
(45) Date of Patent: Oct. 24, 2006

(54) LAUNDRY ROOM AND APPLIANCE MAT

(76) Inventor: David L. Browning, 1813 Dorchester Dr., Oklahoma City, OK (US) 73120

( * ) Notice: Subject to any disclaimer, the term of this patent is extended or adjusted under 35 U.S.C. 154(b) by 0 days.

(21) Appl. No.: 11/361,242

(22) Filed: Feb. 24, 2006

(51) Int. Cl.
*F16L 55/07* (2006.01)
*G08B 21/00* (2006.01)

(52) U.S. Cl. ...................... 137/312; 220/571; 222/108

(58) Field of Classification Search ................ 137/312, 137/313; 222/108; 220/571; 4/251.1
See application file for complete search history.

(56) References Cited

U.S. PATENT DOCUMENTS

| | | | | |
|---|---|---|---|---|
| 4,889,155 | A | 12/1989 | Trotter, Sr. | |
| D313,722 | S | 1/1991 | Axelson | |
| 5,199,457 | A | 4/1993 | Miller | |
| D337,154 | S | 7/1993 | Simpson | |
| D347,468 | S | 5/1994 | Johnson | |
| 5,452,739 | A | 9/1995 | Mustee | |
| D388,566 | S | 12/1997 | Reid | |
| 5,881,762 | A | 3/1999 | Janesky | |
| 5,918,617 | A | 7/1999 | Garth | |
| 6,135,133 | A * | 10/2000 | Ridgeway, Jr. | 137/312 |
| 6,568,419 | B1 * | 5/2003 | Robinson et al. | 137/312 |
| 6,637,453 | B1 * | 10/2003 | Robinson | 137/312 |
| 6,639,517 | B1 * | 10/2003 | Chapman et al. | 137/312 |
| 6,950,032 | B1 | 9/2005 | Hewitt | |
| 6,976,501 | B1 | 12/2005 | Pratt | |
| 7,051,748 | B1 * | 5/2006 | VanBasten | 137/312 |

* cited by examiner

*Primary Examiner*—Kevin Lee

(57) ABSTRACT

A laundry room protective mat includes a rubber base mat with a perimeter rim and an inner fabric cushion to protect the floor in the laundry room from incidental and accidental water leaking from the washer, water and drain hoses and water connections. The mat also provides a cushion to dampen vibrations and prevent movement of the washer and dryer during operation and to protect the floor from movement of the washer and dryer located upon the mat within the perimeter rim. The perimeter rim is also provided with a drain outlet and a connecting hose to evacuate water within the perimeter rim of the mat and may also include a water sensor integrated within the perimeter rim to detect the presence of water within the perimeter rim to alert the user.

4 Claims, 2 Drawing Sheets

LAUNDRY ROOM AND APPLIANCE MAT

CROSS REFERENCE TO RELATED APPLICATIONS

None

I. BACKGROUND OF THE INVENTION

1. Field of Invention

A laundry room protective mat includes a rubber base mat with a perimeter rim and an inner fabric cushion to protect the floor in the laundry room from incidental and accidental water leaking from the washer, water and drain hoses and water connections. The mat also provides a cushion to dampen vibrations and prevent movement of the washer and dryer during operation and to protect the floor from movement of the washer and dryer located upon the mat within the perimeter rim. The perimeter rim is also provided with a drain outlet and a connecting hose to evacuate water within the perimeter rim of the mat and may also include a water sensor integrated within the perimeter rim to detect the presence of water within the perimeter rim to alert the user.

2. Description of Prior Art

The following United States patents were discovered and are disclosed within this application for utility patent. All relate to protective mats which are located under appliances to prevent water damage or escape from under the appliance.

A rigid component barrier installed and embedded within concrete, is disclosed in U.S. Pat. No. 6,976,501 to Pratt, which surrounds an appliance. A base surrounding barrier is disclosed in U.S. Pat. No. 5,881,762 to Janesky, which is placed underneath a water containing appliance and bonded to the floor to contain leakage with a garden hose fitting to attach to the base to drain collected water. An alarm means to be activated during the presence of water is also contemplated, sensing a certain water level within the container. An overflow tray is disclosed in U.S. Pat. No. 5,452,739 to Mustee, which has a central drain incorporated into the floor plumbing and internal non-skid lateral support surfaces to support the legs of the appliance. A washing machine is depicted in the drawings. The tray has a removable front gate to access the placement of the appliance within the tray without deforming or damaging the perimeter edging.

Four U.S. Design patents disclose a water catcher for an appliance, No. D337,154 to Simpson, a washing machine receptacle, No. D347,468 to Johnson, a drain tray, No. D338,566 to Reid., and a water mat, No. D313,722 to Axelson.

II. SUMMARY OF THE INVENTION

As indicated in the above prior art, appliances that utilize water are known to leak when they break, with the water used by the appliance often resulting in damage to the floor, the surrounding structures of the home and even severe structural damage. Several inventions have attempted to address the issue of containing the causal water leakage when the appliance breaks, or the supply lines to the appliance fail. Most of the prior inventions address water containment, but do not address the prevention of appliance failure nor do they provide an alert to the owner that water is present is present under and around the appliance. The prior art also inhibits the ability to place an appliance on the mat using the most conventional form of hand truck or dolly to deliver and install the appliance, the dolly perhaps causing damage to the containment device perimeter as the appliance is driven over the margin of the perimeter.

The present laundry room mat provides a flexible and resilient molded mat having a base and deformable upright perimeter margins, an inner absorbable cushioned fabric base liner which is placed upon the base within the perimeter margins, at least one drain outlet incorporated into side or rear perimeter margins, a water level sensing means in the side or rear perimeter margins and a water-resistant fabric sleeve attached to an inner portion of the rear perimeter margin, the sleeve attached around the supply lines to the appliance and diverting water leakage from the supply lines or hose connections to the fabric base liner, the fabric base liner being a color which darkens in appearance when moistened. The fabric base liner also provides a dampening to the appliance to absorb vibration often associated with an appliance during a spin or drying cycle, or when becoming offbalance during use, reducing damage to the floor, the appliance and the surrounding area caused by vibration of the appliance. The perimeter margins deform and compress when an appliance is installed or removed on the mat, but return to an upright position after the appliance is installed or removed. The drain outlet may be permanently attached to a drain hose, or may provide a drain outlet plug to be removed and a drain hose attached to abate the water contained within the mat.

The primary objective of the laundry room mat is to provide a mat to contain water leakage from an appliance and the appliance supply lines. A second objective is to provide the mat with a fabric base liner that provides a visual indication of water presence by changing color and an audible indication of water by a later level sensing means. A third objective is to provide the mat and the base liner to cushion and dampen any vibration of the appliance during use to avoid damage to the floor and to the appliance and surrounding areas.

III. DESCRIPTION OF THE DRAWINGS

The following drawings are submitted with this utility patent application.

IV. DESCRIPTION OF THE PREFERRED EMBODIMENT

Figure 1:
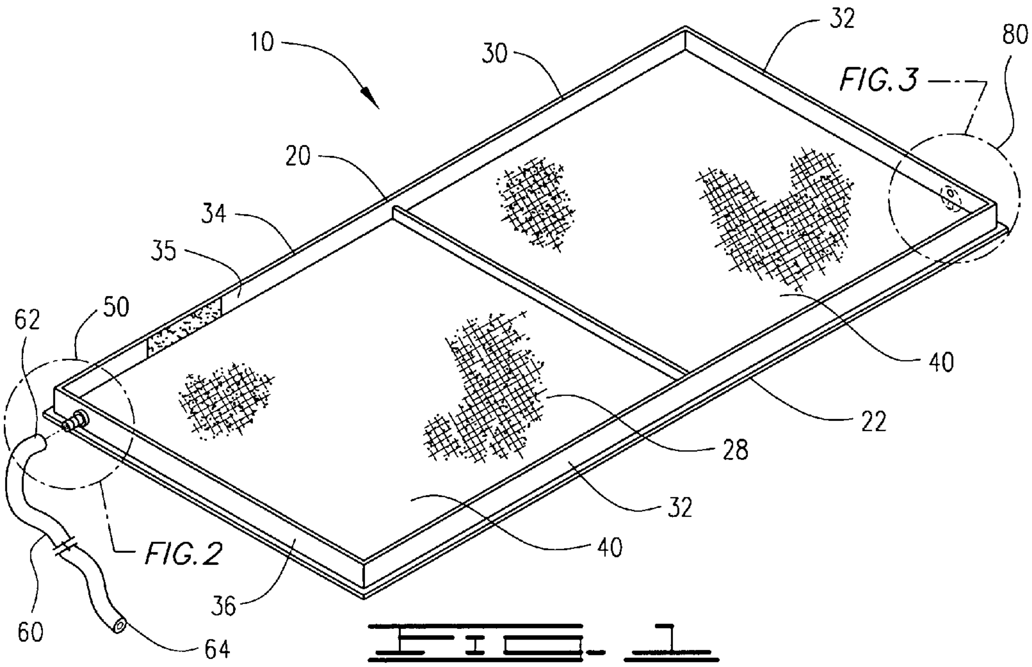
FIG. 1 is an upper perspective view of the protective mat.

A protective mat device 10 for use under an appliance 100, providing a vibration dampening cushion for the appliance 100, a floor protection barrier under the appliance 100 and a water retention capability to contain causal water leakage from the appliance and attached supply hoses 102 and drain hoses 105, preventing damage to the floor and the area surrounding the appliance 100, shown in FIGS. 1–5 of the drawings, the protective mat device 10 first comprising a water-proof base mat 20 having a flat base member 22 defining a lower surface 24 and an upper surface 26 providing a flexible outer perimeter ridge 30 defining an inner surface area 28, the outer perimeter ridge 30 having a rear portion 32, a front portion 34 and side portions 36. A padded fabric cushion liner 40 fitted within the inner surface area 28 lies upon the upper surface 26 and is water-absorbable. At least one water evacuation means 50 is provided in the outer perimeter ridge 30 to remove water contained within the inner surface area 28 of the base mat 20. A flexible water-resistant hose sleeve 70, adapted to encompass water supply hoses 102 and a drain hose 105 of the appliance, if any, includes a removable base attaching means 75 located on a lower end 78 of the hose sleeve 70, the base attaching means 75 connected to an inner surface 35 of the rear portion 34 of the outer perimeter ridge 30, diverting water leakage from the supply or drain hoses 102, 105 to the inner surface area 28 of the base mat 20 where the water is absorbed by the cushion liner 40 and contained within the outer perimeter ridge 30. A water presence sensor 80 may be provided in the outer perimeter ridge 30 which includes an audible alert mechanism 82 activated when an amount of water is present within the outer perimeter ridge 30, FIG. 3, or may include a relay to a remote water supply cutoff means integrated within the supply lines to the appliance, not shown.

Figure 2:
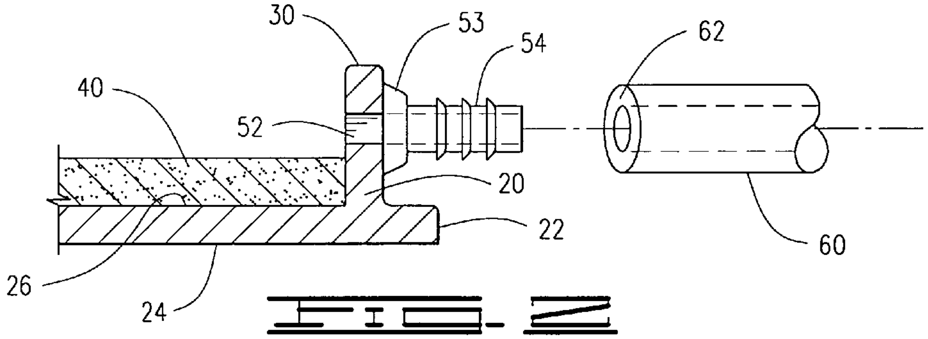
FIG. 2 is a side cross-sectional view of the water evacuation means in the outer perimeter ridge along section line FIG. 2 in FIG. 1.
Figure 3:
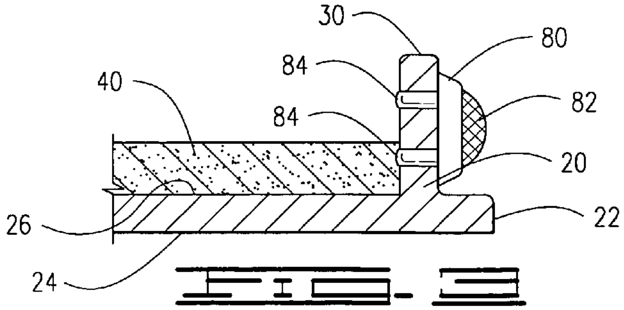
FIG. 3 is a side cross section view of a water presence sensor in the outer perimeter ridge along section line FIG. 3 in FIG. 1.

The base mat 20 would preferably be a flexible rubber mat with the outer perimeter ridge 30, shown in FIGS. 1–3 of the drawings, extending upward from the flat base member 22 forming a water reservoir defined by the upper surface 26 and the outer perimeter ridge 30. The outer perimeter ridge 30 would be resilient in order to deform and compress when the appliance 100 is being installed upon the cushion liner 40 within the inner surface area 28 of the base mat 20, allowing a dolly or other wheeled transport device to be moved over the outer perimeter ridge 30, the outer perimeter ridge 30 returning to an upright position, FIGS. 2 and 3, once the dolly or transport device is removed from under the appliance being installed. Most likely, installation of the appliance would occur over the front portion 32 of the outer perimeter rim 30, so at least this front portion 32 would require the flexibility and resilience of the preferred characteristics noted above.

The fabric cushion liner 40 further comprises an absorbable material having the ability to absorb and retain water and also to provide vibration dampening to the appliance being operated above. As often the case when the appliance is a washing machine, vibration is present during operation and especially during the spin cycle of the appliance. Optimally, the cushion liner 40 would provided the vibration dampening when wet or when dry, the dry state hopefully being the only state at which the protective mat device 10 would be used. In addition, the fabric cushion liner 40 would best be presented as a lighter color which would darken when water is present, as would be by example when a light blue fabric is made wet, it would change color to a dark blue to indicate the presence of water. The fabric cushion liner 40 should also be made of a material possessing the physical characteristics that would resist mildew when wet, retain the absorbed water during removal from the base mat and be quickly dried outside the mat by squeezing the cushion liner and allowing it to dry either by forced air or simply by hanging the cushion liner 40 in a vertical plane.

The water evacuation means 50 may be provided as shown in FIGS. 1–2 of the drawings, including a grommet 52 penetrating the outer perimeter ridge 30 with a hose attaching nipple 54 attached to an outer surface 53 of the grommet 52. An attaching end 62 of a removable drain hose 60 would attach to the hose attaching nipple 54 and direct water being drained from the inner surface area 28 out of a releasing end 64 of the removable drain hose 60 to a location outside the base mat 20, preferably an outside environment not within the dwelling where the appliance 100 and base mat 20 are located. The drain hose 60 may be permanently attached to the hose attaching nipple 54, or may be attached only when the need to drain the inner surface area, with the hose attaching nipple being plugged when the drain hose is not attached, not shown.

Figure 4:
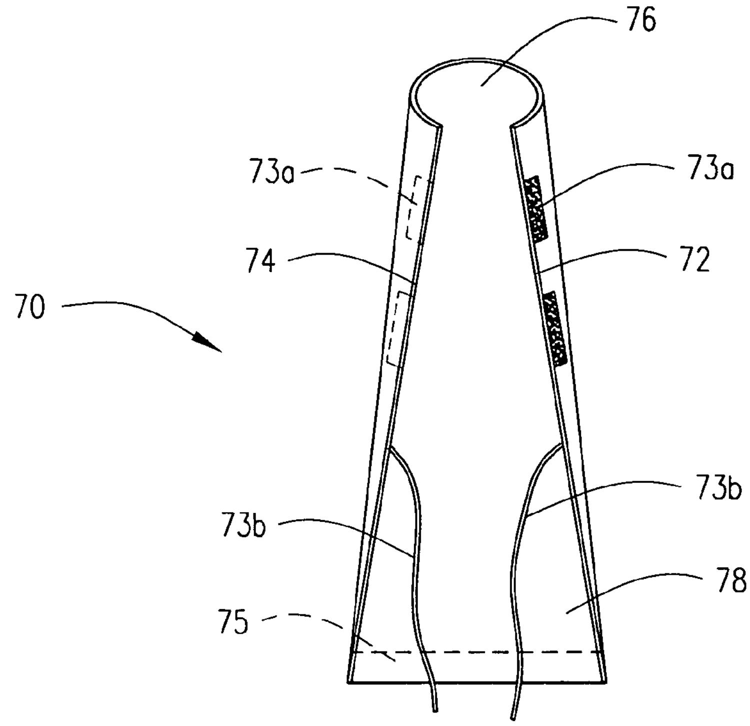
FIG. 4 is a front view of the hose sleeve.
Figure 5:
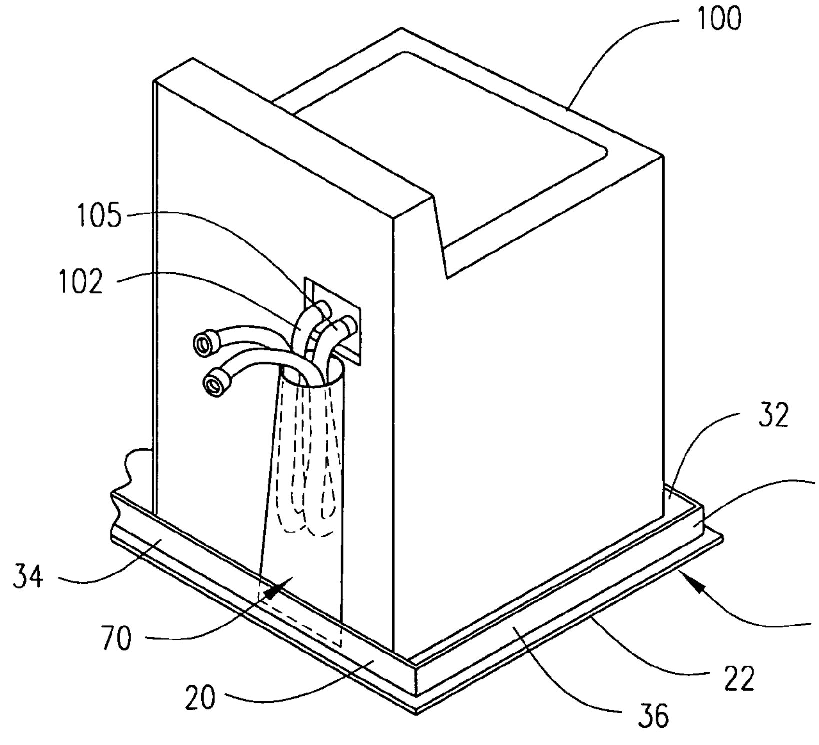
FIG. 5 is a rear view of an appliance setting upon the protective mat with the hose sleeve surrounding the supply lines of the appliance, the hose sleeve attached to the protective mat.

The hose sleeve 70 is preferably a rectangular fabric material, FIG. 4, having a first side 72 and second side 74 attaching by a side attaching means 73*a*, 73*b*, forming a cylinder, having an upper end 76 attached to the supply hose 102 of the appliance 100 at or near the supply hose connections between the supply faucets and the appliance 100, FIG. 5, with a lower end 78 having the removable base attaching means 75 connecting the hose sleeve 70 to the inner surface 35 of the rear portion 34 of the outer perimeter ridge 30, the lower end 78 directing any causal water diverted by the sleeve 70 to the inner surface area 28 to be contained until drained or removed. Either one hose sleeve or an additional hose sleeve may also contain the drain hose 105 from the appliance 100 to also direct water leaking from the drain hose 105 onto the inner surface area 28 of the base mat 20.

The water presence sensor 80 may be included as an optional feature of the protective mat device 10. The water presence sensor 80 may be presented as formed within the outer perimeter ridge 30, FIGS. 1 and 3, to be activated when water reaches a certain depth within the inner surface area 28, or it may be incorporated within the fabric cushion liner, not shown. The water presence sensor 80 may provide the audible alert mechanism 82 activating when an electrical contact bridge 84 closes an electrical circuit within the water presence sensor 80, or may complete an electrical signal to a remote audible sensor, not shown, or a remote water cutoff mechanism integrated with the water supply faucets to the appliance, also not shown, cutting off any water flow to the appliance.

While the invention has been particularly shown and described with reference to a preferred embodiment thereof, it will be understood by those skilled in the art that changes in form and detail may be made therein without departing from the spirit and scope of the invention.

What is claimed is:

1. A protective mat device for use under an appliance, providing a vibration dampening cushion for: the appliance, a floor protection barrier under the appliance and a water retention capability to contain causal water leakage from the appliance and connected water supply and drain lines, preventing damage to the floor and the area surrounding the appliance, said protective mat device comprising:

a water-proof base mat defining a flat base member with a lower surface and an upper surface from which extends a flexible outer perimeter ridge having a front portion, a rear portion and side portions, said outer perimeter ridge further defining an inner surface area;

a padded water-absorbing cushion liner fitted within said inner surface area;

at least one water evacuation means within said outer perimeter to provide drainage of water present within said inner surface area;

at least one flexible water-resistant hose sleeve having a first side and a second side attaching together by a side attaching means around said water supply and drain lines of said appliance at an upper end of said hose sleeve, said hose sleeve further having a lower end having a base attaching means removably connected to an inner surface of said rear portion of said outer perimeter ridge diverting any water leakage from said water supply and drain lines of said appliance to said inner surface area of said water-proof base mat and said cushion liner; and a water presence sensor located in said outer perimeter ridge having an audible alert mechanism activated when water is present within said outer perimeter ridge.

2. The protective mat, as disclosed in claim 1, wherein further comprising:

said outer perimeter ridge is resilient to deform and compress when an appliance is installed within said inner surface area on said upper surface of said base member, said outer perimeter ridge returning to an upright position after being deformed and compressed.

3. The protective mat as disclosed in claim 1, wherein the cushion liner is an absorbable material possessing the physical characteristics of absorbing and retaining water, dampening vibration of said appliance, changing color or color intensity when water is present upon said cushion liner, resisting mildew, and retaining absorbed water during the removal of said cushion liner from said base mat to dry said cushion liner.

4. The protective mat, as disclosed in claim 1, said water evacuation means further comprising:

a grommet penetrating said outer perimeter ridge with a hose attaching nipple attached to an outer surface of said grommet; and a drain hose having an attaching end attached to said attaching nipple and a releasing end located outside said base mat.

* * * * *